(12) United States Patent
Liu et al.

(10) Patent No.: US 10,482,549 B2
(45) Date of Patent: Nov. 19, 2019

(54) DAILY ELECTRICITY GENERATION PLAN MAKING METHOD OF CASCADE HYDRAULIC POWER PLANT GROUP

(71) Applicant: WUHAN UNIVERSITY, Hubei (CN)

(72) Inventors: Pan Liu, Hubei (CN); Bo Ming, Hubei (CN); Mengyue Ma, Hubei (CN); Xizhen Chen, Hubei (CN); Zejun Li, Hubei (CN); Wang Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 337 days.

(21) Appl. No.: 15/303,403

(22) PCT Filed: Apr. 30, 2014

(86) PCT No.: PCT/CN2014/076566
§ 371 (c)(1),
(2) Date: Oct. 11, 2016

(87) PCT Pub. No.: WO2015/154318
PCT Pub. Date: Oct. 15, 2015

(65) Prior Publication Data
US 2017/0039659 A1    Feb. 9, 2017

(30) Foreign Application Priority Data
Apr. 11, 2014   (CN) .......................... 2014 1 0145034

(51) Int. Cl.
*G06Q 50/06* (2012.01)
*G06Q 10/06* (2012.01)

(52) U.S. Cl.
CPC ....... *G06Q 50/06* (2013.01); *G06Q 10/06315* (2013.01)

(58) Field of Classification Search
CPC .......... G06Q 10/00; G06Q 40/00; G06Q 40/06
(Continued)

(56) References Cited

U.S. PATENT DOCUMENTS

| 5,432,710 A | * | 7/1995 | Ishimaru | ................ | G06Q 50/06 |
| | | | | | 705/412 |
| 7,343,360 B1 | * | 3/2008 | Ristanovic | ............. | G06Q 30/08 |
| | | | | | 705/412 |

(Continued)

FOREIGN PATENT DOCUMENTS

| CN | 102004835 A | 4/2011 |
| CN | 102156815 A | 8/2011 |

(Continued)

OTHER PUBLICATIONS

Reservoir operation for hydropower optimization:, Aug. 1995, Siidhana, vol. 21, pp. 503-510. (Year: 1995).*

*Primary Examiner* — Romain Jeanty
(74) *Attorney, Agent, or Firm* — JCIP Global Inc.

(57) ABSTRACT

A daily electricity generation planning method of a cascade hydropower plants is disclosed, and the method is comprised of the steps as follows: step 1, regardless of the constraints for opening and closing the generator, taking the power similarity between the power plant group and the typical demand as one of optimization objectives, and performing a first optimization to obtain a daily electricity generation plan; step 2, according to the derived daily electricity generation plan, determining an opening and closing status for the generator; and step 3, considering the constraints for opening and closing the generator, taking the power similarity between the power plant group and the typical demand as the optimization objective, performing a second optimization to obtain the daily electricity generation plan.

4 Claims, 1 Drawing Sheet

(58) Field of Classification Search
USPC .......................................................... 705/7.29
See application file for complete search history.

(56) References Cited

U.S. PATENT DOCUMENTS

| | | | | |
|---|---|---|---|---|
| 7,464,551 | B2 * | 12/2008 | Althaus | F02C 6/16 |
| | | | | 60/646 |
| 7,512,540 | B2 * | 3/2009 | Gluck | G06Q 30/02 |
| | | | | 705/1.1 |
| 8,256,219 | B2 * | 9/2012 | Hinders | F28D 9/0006 |
| | | | | 60/641.2 |
| 9,127,639 | B2 * | 9/2015 | Cho | F03B 13/10 |
| 9,444,252 | B2 * | 9/2016 | Bourgeau | H02J 1/12 |
| 9,466,034 | B2 * | 10/2016 | Viassolo | G06Q 10/00 |
| 9,953,117 | B2 * | 4/2018 | Ghosh | G06F 17/5009 |
| 10,298,013 | B2 * | 5/2019 | Yang | H02J 3/14 |
| 2012/0150679 | A1 * | 6/2012 | Lazaris | G06Q 30/0605 |
| | | | | 705/26.2 |
| 2013/0268131 | A1 * | 10/2013 | Venayagamoorthy | G05F 5/00 |
| | | | | 700/286 |
| 2014/0316973 | A1 * | 10/2014 | Steven | G06Q 50/06 |
| | | | | 705/37 |
| 2015/0088576 | A1 * | 3/2015 | Steven | G06Q 50/06 |
| | | | | 705/7.22 |
| 2015/0302332 | A1 * | 10/2015 | Wang | G06Q 50/06 |
| | | | | 705/7.22 |

FOREIGN PATENT DOCUMENTS

| | | |
|---|---|---|
| CN | 102567847 A | 7/2012 |
| CN | 102904249 A | 1/2013 |

* cited by examiner

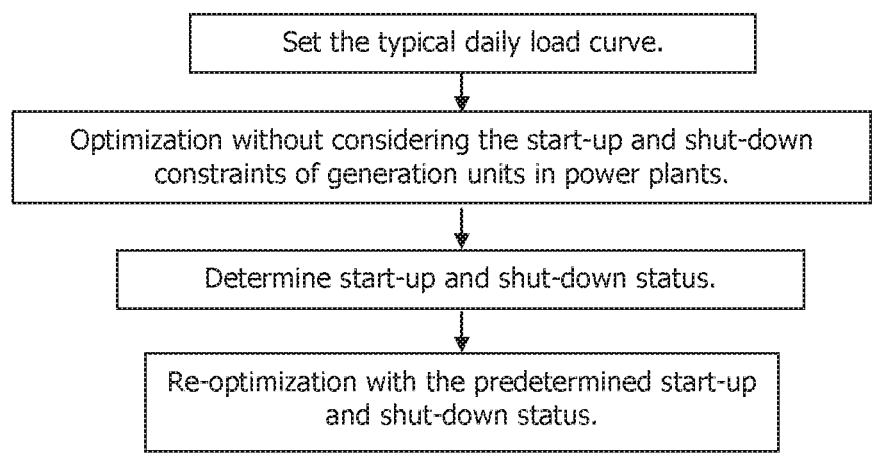

DAILY ELECTRICITY GENERATION PLAN MAKING METHOD OF CASCADE HYDRAULIC POWER PLANT GROUP

TECHNICAL FIELD

This patent belongs to the technical field of economic operation of hydropower plants. Specifically, it is a method to derive daily electricity generation plan of cascade hydropower plants.

BACKGROUND TECHNIQUE

Cascade hydropower plants can improve the system security and water utilization efficiency by hydraulic and electricity compensation. By developing the daily electricity generation plan for cascade hydropower plants, the loads of generators of the plant and their open/close status can be determined while satisfying the daily available water and grid demand, thus increasing the water utilization efficiency and maximizing economic benefits.

The steps of developing traditional daily generation plan for cascade hydropower plants are as follows: (1) input data of short-term runoff forecast, and determine the daily available water for each reservoir according to their long-term operational results; (2) take the maximum electricity generation benefits as one of the optimization objectives; (3) determine the constraints for optimizing the cascade hydropower plants; and (4) derive the daily electricity generation plan by optimization based on the above steps.

The problems of existing methods are as follows: (1) The constraints for the gird demand are neglected in the optimization, thus failing to generate a bimodal load curve, and (2) it is difficult to use the dynamic programming algorithm for the optimization model due to the constraints of the open/close state for the hydropower plants generators.

SUMMARY OF THE INVENTION

To overcome the defects of traditional techniques, this patent provides a method for deriving the daily electricity generation plan for cascade hydropower plants, which considers the constraints for the grid demand.

The steps of the proposed method are as follows:

Step 1: analyzing historical data of daily loads of each plant, and select the typical load curves of each plant.

Step 2: Using the maximum similarity between a power load of the hydropower plants and a typical daily load demand as one of the optimization objectives without considering constraints for opening and closing state of the generators of hydropower plants, and then performing the first optimization to obtain the daily electricity generation plans by using reservoir operation methods.

Step 3: based on the daily electricity generation plans of each plant from Step 2, the opening and closing state process of each generator is protocoled, which includes the order and number.

Step 4: increasing the constraints for opening and closing state of each generator, performing the second optimization with the same objective by using reservoir operation methods as illustrated in Step 2, and obtain the daily electricity generation plan of each plant.

Note that the first optimization mentioned in Step 2 is to optimize a total power output of the cascade hydropower plants and determine corresponding opening and closing state of the generator sets of each plant.

However, the second optimization mentioned in Step 4 is to optimize the power output of each generator in each plant according to the opening or closing state.

The sub-steps in Step 2 are as follows:

2.1: using optimal allocation method to determine the power output of each plant, and determine a best total water consumption curve according to the configuration of generators; and then determining the constraints based on the total water consumption curve.

2.2: taking the maximum similarity between the power output and the typical daily load demand as one of the optimization objectives without considering constraints for opening and closing state of the generators of hydropower plants, and then optimize the daily electricity generation plan of each plant.

The similarity between the power output and typical daily load demand is characterized as the correlation coefficient:

$$r = \frac{\sum_{t=1}^{T}[(E_i - \overline{E}) \cdot (D_i - \overline{D})]}{\sqrt{\sum_{t=1}^{T}(E_i - \overline{E})^2 \sum_{t=1}^{T}(D_i - \overline{D})^2}}$$

wherein, T is the number of the total operation periods; $E_t$ is total energy production of all the plants during the t-th period; $\overline{E}$ is the mean of the $E_t$(t=1, 2, 3, ..., T); $D_t$ is the load demand during the t-th period; $\overline{D}$ is the mean of $D_t$ (t=1, 2, 3, ..., T).

In sub-step 2.2, the dynamic programming (or other reservoir operation methods) is used to optimize the daily electricity generation plan of the cascade hydropower plants.

In Step 2, the other optimization objective includes the maximum generation benefit of the system.

By analyzing historical data of daily power output data of the hydropower plants, the typical daily load curves of each plant are obtained. The generation plans of each plant are optimized with the objective of the maximum similarity between the power output and the typical daily load demand. This patent applies to not only single hydropower plant but also cascade hydropower plants.

Compared with existing techniques, this invention has two obvious advantages:

(1) The load demands of the grid are neglected in traditional techniques. However, this invention take the maximum similarity between the power output and the typical daily load demand as one of the objectives in the process of making daily electricity generation plans. As a result, the electricity generation strategies of each plant match the actual situation better.

(2) Two optimization processes are carried out. The first optimization is to optimize the total power output of the cascade hydropower plants and determine corresponding state of the generators of each plant. The second optimization is to optimize the power output of each generator in each plant according to the opening and closing state.

BRIEF DESCRIPTION OF THE DRAWINGS

The sole FIGURE is the flowchart of the method of this patent.

DETAILED DESCRIPTION OF THE EMBODIMENTS

Details about specific embodiments of this patent are as follows.

The steps of deriving daily generation plan of cascade hydropower plants are as follows.

Step 1: The typical daily load curves of the hydropower plants are obtained by analyzing the historical data of daily load demands.

Specifically, the average load demands of each season are selected as the typical daily load curves.

Step 2: Determine the constraints and the optimization objectives, and use the optimization algorithm to optimize the daily generation plans of cascade hydropower plants.

Specifically, use optimal allocation method to allocate the power output of each plant that should be generated, and determine the best total water consumption curve according to the configuration of the generator sets; Then, determine the constraints based on the total water consumption curve. Finally, the dynamic programming algorithm or other optimization methods are used to optimize the generation plan of cascade hydropower plants without considering the opening and closing state of the generators. In the specific embodiment, the initial values of the generation plan are set according to the experience.

Unlike the traditional techniques, the constraints for opening and closing state of the generators are not taken into consideration in this patent. Meanwhile, objective (2) is considered in the optimization.

The following optimization objectives are considered.

(1) maximize the generation benefit B:

$$\text{Max } B = \sum_{t=1}^{T}(C_t \cdot E_t) \quad E_t = \sum_{k=1}^{m} P_{k,t} \quad (1)$$

where $E_t$ is the total power production of all the plants during the t-th period; m is the number of hydropower plants in the system; $P_{k,t}$ is the power output of the k-th hydropower plan during the t-th period; $C_t$ is the price at t-th period;

(2) maximize the similarity between the power output and the typical daily load demand:

The similarity between the power output and typical daily load demand can be used to evaluate the degree of satisfying the grid demand, which is characterized as the correlation coefficient r:

$$r = \frac{\sum_{t=1}^{T}[(E_i - \bar{E}) \cdot (D_i - \bar{D})]}{\sqrt{\sum_{t=1}^{T}(E_i - \bar{E})^2 \sum_{t=1}^{T}(D_i - \bar{D})^2}} \quad (2)$$

where T is the number of the total operation periods; $E_t$ is total energy production of all the plants during the t-th period; $\bar{E}$ is the mean of the $E_t$(t=1, 2, 3, . . . , T); $D_t$ is the load demand during the t-th period; $\bar{D}$ is the mean of $D_t$ (t=1, 2, 3, . . . , T).

Note that the correlation coefficient r approaches 1 more closely, indicating the less deviation between the power output and load demand.

The definite constraints in this patent are as follows.

(1) Daily water consumption:

$$\Delta t \sum_{t=1}^{T} Q_{k,t} = W_k, \quad (3)$$

$$k = 1, 2, \ldots, m$$

where $Q_{k,t}$ denotes the generation discharge of k-th plant during t-th period; $W_k$ denotes the planned water consumption of k-th plant in 24 hours; m denotes the number of hydropower plants in the system; $\Delta t$ denotes the time span.

(2) Water balance:

$$V_{k,t+1} = V_{k,t} + (I_{k,t} - Q_{k,t} - QW_{k,t}) \cdot \Delta t \quad (4)$$

where $V_{k,t}$ and $V_{k,t+1}$ denote the initial and terminal water storage of k-th plant at t-th period, respectively; $I_{k,t}$ denotes the inflow of k-th reservoir during t-th period; $QW_{k,t}$ denotes the outflow of the k-th reservoir during t-th period, which can be the leakage or the flood discharge;

(3) Flow relationship between reservoirs:

$$I_{k,t} = IL_{k,t} + Q_{k-1,t-\tau_k} \quad (5)$$

where $IL_{k,t}$ is the local inflow of k-th plant during t-th period; $\tau_k$ is the flow routing time from the upstream (k−1)-th plant to the downstream k-th plant; $Q_{k-1,t-\tau_k}$ generation discharge of k-th plant at the (t−$\tau_k$)-th period.

(4) Power output:

$$PMIN_{k,t} \leq P_{k,t} \leq PMAX_{k,t} \quad (6)$$

where $PMIN_{k,t}$ is the lower limit of the power output, depending on the type and characteristics of hydraulic turbine and electric generator; $PMAX_{k,t}$ is the upper limit of k-th plant during t-th period;

(5) The optimized generation flow curve:

$$Q_{k,t} = Q^*(P_{k,t}, H_{k,t}) \quad (7)$$

where $Q^*(P_{k,t}, H_{k,t})$ is the optimal generation flow for the k-th plant at t-th period when the water-head is $H_{k,t}$ and the output is $P_{k,t}$.

(6) Storage:

$$V_{k,min} \leq V_{k,t} \leq V_{k,max} \quad (8)$$

where $V_{k,min}$ and $V_{k,max}$ denote the lower and upper storage limits of the reservoir at t-th period, respectively; The $V_{k,max}$ can be flood limited water level during the flood season, and normal water level during non-flood season.

(7) Release:

$$Q_{min} \leq Q_k \leq Q_{max} \quad (9)$$

where $Q_{min}$ and $Q_{max}$ denote the lower and upper release limits of the k-th reservoir at t-th period, respectively;

(8) Reserve capacity $$\sum_{k=1}^{m} P'_{k,t} \geq P'_{min} \quad (10)$$

where $P'_{min}$ the minimum requirement of the reserve capacity at t-th period;

Step 3: Determine the opening and closing sequence and corresponding number of the generators based on the daily electricity generation plan of the Step 2, which is formulated as follows:

$$(X_{k,t-1}^{on} - T^{on}) \cdot (U_{k,t-1} - U_{k,t}) \geq 0 \quad (11)$$

$$(X_{k,t-1}^{off} - T^{off}) \cdot (U_{k,t} - U_{k,t-1}) \geq 0 \quad (12)$$

where $X_{k,t-1}^{on}$ is opening duration of the k-th generator set from the beginning to the (t−1)-th period; $T^{on}$ is the minimum opening duration; $U_{k,t}$ and $U_{k,t-1}$ are the opening or closing state of the k-th generator set at t-th period and (t−1)-th period, respectively, in which state 1 is for opening, and state 0 is for closing; $X_{k,t-1}^{off}$ is the closing duration of the k-th generator set from the beginning to the (t−1)-th period; $T^{off}$ is the minimum closing duration.

Step 4: Consider constraints of the opening and closing state of the generators, use the dynamic programming methods or other algorithms to optimize the daily generation scheduling of cascade hydropower plants again, and obtain the daily generation plan of the cascade hydropower plants finally. Note that the objectives and other constraints are the same as that of the Step 2.

The invention claimed is:

1. A daily electricity generation planning method of cascade hydropower plants, for optimize the economic benefits of the cascade hydropower plants, comprising the following steps of using a computer having a processor for:
    Step 1: analyzing historical data of daily load demands of each hydropower plant to obtain a typical load curves having a typical daily load demand for each hydropower plant;
    Step 2: performing a first optimization to obtain a daily electricity generation plan of the cascade hydropower plants by using reservoir operation methods and taking a degree of similarity between a power load of the hydropower plants and the typical daily load demand of each of the hydropower plants being closest as an optimization goal without considering constraints for opening and closing state of the generators of the hydropower plants, as to optimize a total power output of the cascade hydropower plants, wherein the Step 2 comprises following two sub-steps:
    Step 2.1: using optimal allocation method to determine the power output of each hydropower plant and determine a best total water consumption curve according to the configuration of generator sets, and then determining the constraints of opening and closing state of the generator based on the total water consumption curve;
    Step 2.2: taking the maximum similarity between the power output and the typical daily load demand as one of the optimization objectives without considering the constraints of opening and closing state of the generators in hydropower plants, and then optimize the daily electricity generation plan of each plant;
    Step 3: planning the opening and closing state of each generator set according to the daily electricity generation plans of each hydropower plant derived from Step 2, wherein the opening and closing state of each generator set includes a sequence of opening and closing of each generator and the number of each generator to be open or close; and
    Step 4: increasing the constraints of the opening and closing state of each generator set, and performing a second optimization to obtain the daily electricity generation plan of each hydropower plant by using reservoir operation methods with the same optimization goal in Step 2, as to optimize power output of each generator and water consumption in each hydropower plant for satisfying the typical daily load demand.

2. The daily electricity generation plan making method of cascade hydropower plants of claim 1, wherein:
    the first optimization stated in Step 2 is to optimize a total power output of the cascade hydropower plants and determine corresponding opening and closing state of the generator sets of each plant.

3. The daily electricity generation plan making method of cascade hydropower plants of claim 1, wherein:
    the second optimization stated in Step 4 is to optimize the power output of each generator set of each plant according to the opening and closing state.

4. The daily electricity generation plan making method of cascade hydropower plants of claim 1, wherein:
    the similarity between the power output and typical daily load demand is characterized as the correlation coefficient:

$$r = \frac{\sum_{t=1}^{T}[(E_i - \overline{E}) \cdot (D_i - \overline{D})]}{\sqrt{\sum_{t=1}^{T}(E_i - \overline{E})^2 \sum_{t=1}^{T}(D_i - \overline{D})^2}}$$

wherein, T is the number of the total operation periods; Et is total energy production of all the plants during the t-th period; $\overline{E}$ is the mean of the Et(t=1, 2, 3, . . . , T); Dt is the load demand during the t-th period; $\overline{D}$ is the mean of Dt (t=1, 2, 3, . . . , T).

\* \* \* \* \*